United States Patent
Bärecke et al.

(10) Patent No.: US 12,472,898 B2
(45) Date of Patent: Nov. 18, 2025

(54) METHOD FOR AUTOMATICALLY CARRYING OUT SAFETY MEASURES WHEN A VEHICLE DRIVES ON A SHOULDER, ELECTRONIC VEHICLE GUIDANCE SYSTEM, AND VEHICLE

(71) Applicant: Volkswagen Aktiengesellschaft, Wolfsburg (DE)

(72) Inventors: Frank Bärecke, Wolfsburg (DE); Steve Simon, Wolfsburg (DE); Thomas Kolms, Wasbüttel (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 48 days.

(21) Appl. No.: 18/565,696

(22) PCT Filed: May 20, 2022

(86) PCT No.: PCT/EP2022/063754
§ 371 (c)(1),
(2) Date: Nov. 30, 2023

(87) PCT Pub. No.: WO2022/253596
PCT Pub. Date: Dec. 8, 2022

(65) Prior Publication Data
US 2024/0367602 A1 Nov. 7, 2024

(30) Foreign Application Priority Data
May 31, 2021 (DE) .................... 10 2021 205 553.2

(51) Int. Cl.
*B60R 21/01* (2006.01)
*B60N 2/42* (2006.01)
(Continued)

(52) U.S. Cl.
CPC ............... *B60R 21/01* (2013.01); *B60N 2/42* (2013.01); *B60Q 1/46* (2013.01); *B60Q 9/00* (2013.01); *B60R 22/48* (2013.01)

(58) Field of Classification Search
CPC .................. B60R 21/01; B60R 21/013; B60R 2021/01259; B60R 2021/01265;
(Continued)

(56) References Cited

U.S. PATENT DOCUMENTS 9,283,958 B2   3/2016   Ulbricht et al.
9,290,174 B1   3/2016   Zagorski
(Continued)

FOREIGN PATENT DOCUMENTS

DE   102004027085 A1   12/2005   ............... B60Q 1/52
DE   102004045103 A1   3/2006   ............... B60Q 9/00
(Continued)

OTHER PUBLICATIONS

German Office Action, Application No. 102021205553.2, 7 pages, Jan. 3, 2022.
(Continued)

*Primary Examiner* — Erick R Solis
(74) *Attorney, Agent, or Firm* — Slayden Grubert Beard PLLC (57) ABSTRACT

The disclosure relates to a method for automatically carrying out safety measures when a vehicle drives on a shoulder differing from a roadway, comprising the following: detecting the shoulder which differs from the roadway and laterally adjoins the roadway by means of a detection apparatus of the vehicle, providing information regarding the position and/or type of the shoulder to the vehicle, recognizing that the vehicle is driving on the shoulder by means of an electronic evaluation unit, dangerous evaluating a situation which accompanies the driving of the vehicle on the shoul-
(Continued)

der and/or can accompany the same in the future, by means of the electronic evaluation unit, and carrying out a safety measure by tensioning at least one safety belt of a restraint system of the vehicle depending on the evaluated dangerous situation.

18 Claims, 4 Drawing Sheets

(51) Int. Cl.
  *B60Q 1/46* (2006.01)
  *B60Q 9/00* (2006.01)
  *B60R 22/48* (2006.01)
  *B60W 30/12* (2020.01)

(58) Field of Classification Search
  CPC .......... B60R 2021/01272; B60R 22/48; B60R 2022/4808; B60R 2022/4841; B60R 2300/804; B60W 30/085; B60W 30/12; B60W 2552/05
  USPC .......................................................... 701/45
  See application file for complete search history.

(56) References Cited

U.S. PATENT DOCUMENTS

| | | | |
|---|---|---|---|
| 11,220,263 B2 | 1/2022 | Guecker et al. | |
| 11,511,739 B2 | 11/2022 | Bartels et al. | |
| 2005/0212666 A1* | 9/2005 | Kawazoe | G07C 5/085 340/436 |
| 2012/0259515 A1* | 10/2012 | Freienstein | B60R 21/0132 701/45 |
| 2014/0263800 A1 | 9/2014 | Erlacher et al. | 242/384 |
| 2018/0105180 A1 | 4/2018 | Fung et al. | |
| 2020/0361458 A1* | 11/2020 | Bartels | B60W 50/14 |
| 2022/0242363 A1* | 8/2022 | Odai | B60R 22/48 |
| 2022/0306040 A1* | 9/2022 | Komori | G01S 13/867 |

FOREIGN PATENT DOCUMENTS

| | | | | |
|---|---|---|---|---|
| DE | 102007035504 A1 | 1/2009 | ......... | B60R 21/0132 |
| DE | 102009047373 A1 | 6/2011 | ......... | B60R 21/0132 |
| DE | 102010015547 B4 | 10/2011 | ......... | B60R 21/0134 |
| DE | 102012102459 A1 | 9/2013 | ............ | B60W 30/12 |
| DE | 102012109310 A1 | 4/2014 | ............ | B60W 30/02 |
| DE | 102016116515 A1 | 3/2018 | ............ | B06W 30/08 |
| DE | 102019206875 B3 | 7/2020 | ............ | B60T 8/1763 |
| DE | 102021205553 A1 | 12/2022 | ............... | B60Q 9/00 |
| EP | 3738852 A1 | 11/2020 | ............ | B60T 8/1755 |
| WO | 2022/253596 A1 | 12/2022 | ............ | B60W 30/12 |

OTHER PUBLICATIONS

International Search Report and Written Opinion, Application No. PCT/EP2022/063754, 8 pages, Oct. 21, 2022.

* cited by examiner

METHOD FOR AUTOMATICALLY CARRYING OUT SAFETY MEASURES WHEN A VEHICLE DRIVES ON A SHOULDER, ELECTRONIC VEHICLE GUIDANCE SYSTEM, AND VEHICLE

CROSS-REFERENCE TO RELATED APPLICATIONS

This application claims priority to German Patent Application No. DE 10 2021 205 553.2, filed on May 31, 2021 with the German Patent and Trademark k Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a method for automatically carrying out safety measures when a vehicle drives on a shoulder different from a roadway.

Moreover, the disclosure relates to an electronic vehicle guidance system with a detection unit and an electronic evaluation unit. Moreover, the disclosure relates to a vehicle with a corresponding electronic vehicle guidance system.

SUMMARY

A need exists to improve the safety of passengers of a vehicle when the vehicle drives on a shoulder. The need is addressed by a method, an electronic vehicle guidance system, as well as a vehicle of the independent claim(s). Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

Some embodiments relate to a method for automatically carrying out safety measures when a vehicle drives on a shoulder different from a roadway comprising the following steps:

Detecting the shoulder which differs from the roadway and laterally adjoins the roadway by means of a detection apparatus of the vehicle, Providing information regarding the position and/or type of the shoulder to the vehicle, Recognizing that the vehicle is driving on the shoulder by means of an electronic evaluation unit, Evaluating a dangerous situation which accompanies the driving of the vehicle on the shoulder and/or can accompany the same in the future, by means of the electronic evaluation unit, Carrying out a safety measure by tensioning at least one safety belt of a restraint system of the vehicle depending on the evaluated dangerous situation.

By means of the proposed method, passengers, especially the driver, of a vehicle can be better protected from dangerous situations if a vehicle unintentionally leaves the roadway in an adjacent shoulder. Consequently, the safety can be significantly increased on the shoulder by the proposed method when a vehicle drives on the shoulder. In addition to securing the passengers by tensioning the respective safety belt, the driver of the vehicle for example is alerted by the tensioning of the belt. Consequently, not only is the driver secured and stabilized in a driver's seat by the tensioning, the awareness of the particular dangerous situation is additionally increased, in particular with respect to driving on the shoulder. For example, the respective securing from the tensioning of the safety belt can be used to draw the attention of the driver or other passengers in the vehicle to the particular dangerous situation that has been evaluated, and to therefore draw attention to the current driving task. Due to this increased attention by the driver, the danger of driving on the shoulder can be reduced since the attention of the driver allows corresponding countermeasures to be introduced, in particular executed, sooner.

A shoulder is to be understood as a part of the road crown next to the roadway in the cross-section of a road. The shoulder can frequently be bordered on the side by an embankment. In particular, the shoulder is not only for vehicle traffic, but also for draining surface water from the roadway to the ditches located on the side of the roadway. For example, a shoulder can have a standard width of 1.5 meters. The shoulder can have a routine slope of 6% at the higher or, respectively, 12% at the lower edge of the roadway. In particular, the shoulder is located at the outer edge of the road crown and adjoins the edge strip or, if available, the hard shoulder. The shoulder can generally be arranged on both sides of the paved roadway. The shoulder can serve as a soft shoulder and can accommodate apparatuses of roadway equipment such as traffic signs and/or crash barriers. The shoulder is in particular for lending the paved roadway additional support. For example, the shoulder can be clearly distinguished for a driver of a vehicle by its driving and material contrast to the roadway. For example, the shoulder can have a light base layer of gravel or crushed stone for reinforcement. In particular, the shoulder is for allowing a motor vehicle to be parked on the shoulder without significantly influencing following traffic. For example, this allows pedestrians who are on the shoulder to not be forced to walk on the hard shoulder to reach an emergency call station.

In other words, the shoulder is always located on the side of a roadway on a specific strip. Another different region can be adjacent to the shoulder such as a green area, a meadow or a field. Consequently, the shoulder should not be considered a complete surrounding area next to the roadway, but is a special strip that runs parallel to the roadway. The shoulder can be a region on the side along the roadway with a specific width.

For example, with the assistance of the proposed method, the driver of the vehicle can be supported, or respectively, assisted automatically on the shoulder while the vehicle is driving on the shoulder. For example, this can be performed automatically by an electronic vehicle guidance system, for example a driver assistance system. Accordingly, the safety of the passengers of the vehicle and in particular the other road users in the environment of the vehicle can thereby be increased.

In particular, the vehicle is along the roadway locomotion, wherein during locomotion, continuous monitoring of the region around the vehicle can be carried out by the detection apparatus of the vehicle. This continuous detection allows the shoulder, which differs from the road, to be detected. In particular, the shoulder can be automatically detected with the aid of the detection apparatus. For example, the shoulder can run parallel to the roadway. The detection apparatus of the vehicle can be a sensor system or a camera system, for example. In particular, the detection apparatus can have several sensors and/or cameras. In particular, the shoulder can be determined by evaluating the detected information.

In particular, the electronic evaluation unit can be used to recognize or, respectively, determine the driving on the shoulder by the vehicle depending on the detected information relating to the shoulder and/or the information provided relating to the position and/or the type of shoulder. In particular, a determination or calculation is carried out with the aid of the electronic evaluation unit using the provided or, respectively, detected information so that the driving on the shoulder by the vehicle can be clearly recognized.

The electronic evaluation unit can, for example, be an evaluation system consisting of a plurality of individual units. For example, the electronic evaluation unit can be termed a computing unit. With the aid of the electronic evaluation unit, the driving on the shoulder can be efficiently determined. In particular, the electronic evaluation unit can be a component of an electronic vehicle guidance system of the vehicle or a component of the vehicle. It is also conceivable for the electronic evaluation unit to be part of a server or data cloud external to the vehicle. Consequently, the detection of driving on the shoulder is not carried out in the vehicle, but rather in a unit arranged separately from the vehicle. In this case, the respective information, data and signals can be transmitted via communication technology links between the vehicle, in particular the electronic vehicle guidance system, and the electronic evaluation unit.

For example, the proposed method is a computer-implemented method.

For example, the information relating to the position or the type of the shoulder can be provided by a data cloud and/or server unit and/or server system external to the vehicle. For example, this information can be provided to the vehicle, in particular the electronic evaluation unit, from external information points. In particular, with the position of the shoulder, a global position of the shoulder s provided, in particular on a map. The type of shoulder can be, for example, a surface condition, and/or a length of the shoulder, and/or the width of the shoulder, and/or a slope of the shoulder, and/or objects standing on the shoulder. By using the detected information on the shoulder and the provided position and/or type of shoulder, the electronic evaluation unit can execute a precise and improved determination of whether the vehicle is currently driving on the shoulder.

For example, the electronic evaluation unit can recognize if the vehicle is currently driving on the shoulder depending on environmental information in the environment of the vehicle, and/or GPS positions, and/or navigation data.

With the aid of the electronic evaluation unit, after recognizing the driving on the shoulder, the extent to which a dangerous situation exists can then be evaluated or, respectively, assessed. On the one hand, the basic dangerous situation is evaluated or, respectively, assessed and, in addition, the potential hazard that exists. The dangerous situation is specifically or, respectively, explicitly associated with driving on the shoulder. Accordingly, given the dangerous situation, precisely the current and/or impending shoulder driving is analyzed and evaluated. When evaluating the dangerous situation, the respective danger to the vehicle and/or the passengers of the vehicle is taken into account in particular. This makes it possible to estimate how much the vehicle, and/or the passengers of the vehicle, and/or other road users in the environment of the vehicle are endangered by the vehicle driving on the shoulder.

It is beneficial when the electronic evaluation unit can make a prediction about a future dangerous situation depending on the wide range of detected and/or provided information on driving on the shoulder. Accordingly, the respective dangerous situation can be evaluated when driving on the shoulder, especially over a longer time period. By predicting this dangerous situation, in particular when driving on the shoulder for a longer time, safety measures and/or countermeasures can be introduced early on, and in particular the passengers of the vehicle and/or other road users in the environment of the vehicle can be protected from this potential danger from driving the vehicle on the shoulder. Road safety and in particular the safety of the vehicle and the passengers of the vehicle can thereby be improved, in particular greatly increased.

For example, depending on the evaluated current and/or future dangerous situation, the electronic evaluation unit can generate a corresponding signal, in particular a control signal, with which an automatic tensioning of the at least one safety belt of the restraint system of the vehicle can be initiated, in particular performed. Consequently, the passenger can be secured and made aware early on by the system automatically performing a tensioning of the safety belt, in particular the safety belt of the vehicle seat of the driver, immediately after the evaluation of the dangerous situation. This yields improved safety for the vehicle and in particular the passengers, even in the event of current and/or impending shoulder driving.

In some embodiments, it is provided that the detection apparatus is used to detect a surrounding area in an environment of the vehicle, and/or a position determining unit is used to determine a current position of the vehicle. Depending on the detected surrounding area and/or on the determined position, the electronic evaluation unit recognizes if the vehicle is at least partially, in particular completely, on the shoulder; in particular, a friction coefficient of a ground region on which the vehicle is currently driving is determined, wherein a specific friction coefficient is taken into account for the recognition of driving on the shoulder. This allows the detection or, respectively, determination of driving on the shoulder to be performed more easily, and in particular more efficient, since a wide variety of information can be taken into account.

By means of the detection apparatus, in particular the surrounding area in the environment of the vehicle can be continuously or, detected respectively, monitored; this continuous detection can be used to detect the shoulder and the driving on the shoulder by the vehicle early on. To this end, for example, the detected images or, respectively, pictures of the surrounding area can be evaluated as to whether the vehicle is partially or completely on the shoulder. This is done with the aid of the electronic evaluation unit, in particular with the aid of an image processing unit of the electronic evaluation unit.

In addition or instead of this, the current position of the vehicle is determined by means of the position determining unit. By using the current position of the vehicle, the current position of the vehicle can be compared with the position of the shoulder, for example by traffic maps and/or digital maps. Depending on this comparison, it can therefore be determined if the vehicle is partially or completely on the shoulder. For example, the position determining unit is a global navigation satellite system (GNSS). In particular, the position determining unit can be integrated in the vehicle, in particular in the electronic vehicle guidance system. The position determining unit can also be a component of the electronic evaluation unit. It is also conceivable for the position determining unit to be an independent separate unit such as a service system or a data or cloud application. This can determine the particular position of the vehicle externally to the vehicle and transmit and provide it to the vehicle and/or the electronic evaluation unit, for example using communication technology links.

Another option for determining shoulder driving is to compare the friction coefficient of the ground region on which the vehicle is currently driving. In doing so, the fact that the roadway and the shoulder have different friction coefficients or, respectively, friction values is used here. For example, the current friction coefficient of the ground region can be determined or, respectively, calculated with a detection unit or, respectively, sensor unit of the vehicle, or with another electronic system of the vehicle or a system external to the vehicle. This determined friction coefficient can be compared with specified values. This can, for example, be done by the electronic evaluation unit in an electronic database provided for this purpose. Special values can be specified that allow shoulder driving to be deduced. If the determined friction coefficient corresponds with a specified value of a shoulder, the electronic evaluation unit can determine or, respectively, recognize that the vehicle is currently driving on the shoulder.

In some embodiments, it is furthermore provided that, depending on the evaluated dangerous situation, road users in the environment of the vehicle are visually warned by a lighting apparatus of the vehicle, in particular before the vehicle drives onto the shoulder. In particular, depending on the evaluated dangerous situation, an acoustic and/or visual and/or haptic warning of a driving vehicle is output by an electronic output unit. In particular, the driver is informed by the tensioning of the at least one safety belt. For example, by means of the electronic evaluation unit, a corresponding control signal can be transmitted to a lighting apparatus of the vehicle, and/or another vehicle system, and/or vehicle components of the vehicle directly after evaluating the dangerous situation. The lighting apparatus can, for example, be surrounding area lighting, and/or a beacon, and/or a headlight and/or a reflector of the vehicle. In particular, the lighting apparatus is a hazard warning light device and/or a hazard warning light of the vehicle. This allows road users in the environment of the vehicle to be automatically warned so that they can notify other road users of a possible danger from the vehicle driving on the shoulder. Accordingly, the other road users can prepare or implement corresponding countermeasures and/or safety measures, in particular braking interventions. This yields increased safety in road traffic. In particular, the surroundings of the vehicle are visually warned with the aid of a hazard warning light. It is also conceivable for an acoustic warning to be output to road users by acoustic systems of the vehicle. In this case it would, for example, be beneficial to sound the horn. This yields an improved perception of the impending danger or, respectively, dangerous situation for other road users as well.

Likewise, the driver of the vehicle and/or the passengers of the vehicle can be automatically warned acoustically, and/or visually, and/or haptically of the impending dangerous situation. Accordingly, the in particular the passengers, driver, can be notified of the danger of the current or impending shoulder driving so that appropriate countermeasures can still be initiated and/or carried out. In doing so, the warning can be given by an electronic output unit. The electronic output unit can, for example, be a mobile terminal of the driver or a passenger in the vehicle. Vehicle loudspeakers and/or vehicle displays can also be used to output warnings. For example, the infotainment system of the vehicle can be used to warn passengers and the driver. In the same way, concerning the impending or current driving on the shoulder, information on the automatic tensioning of the safety belts can also be provided. Accordingly, the passengers and/or the driver can be informed or notified that an automatic tensioning of the safety belts will be carried out, and the driver or passengers will not be surprised or even frightened about this.

In some embodiments, it is provided that a classification database is consulted for evaluating the dangerous situation of the recognized driving on the shoulder, wherein the dangerous situation is classified by means of the classification database so that the dangerous situation of driving on the shoulder can be assigned to a first dangerous scenario according to a first class, or at least to a second dangerous scenario according to a second class. This allows a more precise and situation-dependent evaluation of the dangerous situation and the corresponding safety measures to be carried out. Extremely comprehensive information can be taken into account for the classification of the dangerous situation. For example, the type of shoulder, and/or the type of vehicle, and/or the environmental information, and/or a condition of the shoulder, and/or obstacles on the shoulder, and/or the current speed of the vehicle and/or a number, and/or a type of driver assistance system of the vehicle can be taken into account. Accordingly, the exact potential danger or, respectively, danger level of the dangerous situation can be better evaluated and assessed or, respectively, estimated. This is done in particular with the help of the electronic evaluation unit; for example, the classification database can be part of the electronic evaluation unit or function as an external data cloud or service system. With the aid of the classification database, the current dangerous situation can be classified and categorized into different danger levels. By classifying the dangerous situation into different dangerous scenarios, different safety measures and/or procedures can be used for the current or, respectively, impending driving of the vehicle on the shoulder. In the classification database, various measures and/or countermeasures for the respective dangerous scenarios can be provided. This means that corresponding countermeasures and/or safety measures can be provided immediately after the classification of the dangerous situation since they are already provided by the classification database. Accordingly, processing or, respectively, calculation steps can be reduced since the measures associated with the respective dangerous scenarios are already known in advance. Accordingly, safety measures can be performed faster and better such that the safety of the passengers of the vehicle increases. In particular, the dangerous situations can be subdivided and assigned to several different dangerous scenarios. For example, depending on the seriousness or, respectively, level of the danger, a prioritization of the respective dangerous scenarios can also be carried out so that the seriousness of the impending dangerous situation can be estimated depending on certain parameters.

In some embodiments, it is provided that, depending on the classified dangerous situation, at least one electronic driver assistance system is dynamically adapted so that additional safety measures are automatically initiated, in particular carried out, with the at least one electronic driver assistance system. In particular, a stabilization of a seating position of at least one passenger of the vehicle in a vehicle seat is carried out as another safety measure, in particular a duration of the driving on the shoulder is determined when the driving on the shoulder by the vehicle is detected, wherein a deceleration process, in particular an emergency braking process, of the vehicle is automatically carried out if a specified threshold value is exceeded by the determined duration.

For example, after the classification or, respectively, assignment of the dangerous situation to the first dangerous scenario or at least to the second dangerous scenario or to another dangerous scenario, the electronic evaluation unit can generate corresponding signals with which various vehicle systems, and/or vehicle components, and/or at least one electronic driver assistance system can be automatically dynamically adapted. In particular, the respective systems are automatically parameterized and/or configured.

For example, electronic stability control (ESC) or other electronic stability programs such as anti-lock braking systems, traction control, electronic brake force distribution, brake assists or electronic braking systems can be adjusted. By means of this dynamic adjustment, it can be achieved that, on the one hand, the driving on the shoulder by the vehicle can be performed safely, monitored and controlled. In particular, the dynamic adjustment of the electronic driver assistance systems ensures that the vehicle can be safely maneuvered off the shoulder, in particular automatically maneuvered. In particular, to leave the shoulder, the driver can be automatically supported or, respectively, assisted by the adjusted electronic driver assistance systems. For example, shoulder functions of driver assistance systems and/or pre-crash functions can be used for this purpose.

In order to be able to better protect the driver and passengers of the vehicle when driving on the shoulder, additional safety measures can be automatically initiated and carried out. In particular, the stabilization of the driver and/or passengers is important in this context. This is accomplished on the one hand by automatic belt tensioning. Moreover, the seating position of the passengers of the vehicle in the respective vehicle seat can be attained, for example, by automatically adjusting side seat elements and/or headrest elements of the respective vehicle seat. For example, adjustable seat elements of the respective vehicle seats can be set such that the respective passenger in the vehicle seat is securely stabilized or, respectively, positioned in the transverse direction of the vehicle. Accordingly, the respective passenger in the vehicle seat can no longer slide or, respectively, be moved to the left or right. The passenger is accordingly stabilized in the longitudinal direction of the vehicle by the tensioned belt, and in the transverse direction of the vehicle by the respective set seat elements of the vehicle seat.

Another possibility for an additional safety measure or, respectively, an intervention in the driving behavior of the vehicle is that how long the vehicle has already been driving on the shoulder is determined by the electronic evaluation unit, in particular by a timer of the electronic evaluation unit. This duration is determined and compared with a specified time threshold value. If this specified threshold value is exceeded, for example an electronic driver assistance system, in particular the electronic vehicle guidance system, can automatically initiate a braking or, respectively, deceleration process for the vehicle. This is beneficial if the driver can no longer safely move the vehicle off the shoulder by himself. Consequently, the last option here would be the immediate braking of the vehicle so that the vehicle can safely be brought to a standstill. In particular, the respective classified dangerous situation, especially the hurdle of this classified dangerous situation, can be considered in this context so that an emergency braking procedure of the vehicle is initiated and carried out immediately in the event of a highly dangerous situation or, respectively, high potential danger. Accordingly in a worst-case scenario, the vehicle can be brought to a standstill immediately and safely so that the danger to the vehicle, the passengers of the vehicle and other road users can be reduced or, respectively, minimized.

In some embodiments, it is provided that, in order to evaluate the dangerous situation of driving on the shoulder, a region in the environment of the shoulder different from the roadway and the shoulder which directly abuts the shoulder is taken into account; in particular, this region is also detected by the detection apparatus. In other words, the shoulder is bordered on one side by the roadway and here on the other side by this different region. Accordingly, the shoulder is not to be regarded as the complete region in the environment of the roadway, but only as a specified, in particular narrow, side region of the road. For example, the shoulder can be on the side of the roadway, and an additional region can in turn be adjacent to the shoulder. For example, the additional region may be a field path, a meadow, a field road, a pedestrian path, a cycle path or unpaved ground. In particular, the different region is therefore important for since, example, the width or, respectively, and/or length of the shoulder cannot be avoided during a braking process or a maneuvering process when driving on the shoulder, and this additional region can be included in the calculation in order to be able to predict a braking path in a braking process. The region can also be continuously detected by the detection apparatus. For example, the shoulder can have a shoulder width that is smaller than the width of the vehicle so that, for the vehicle to drive safely on the shoulder and for the subsequent safety measures or, respectively, countermeasures, the different region adjacent to the shoulder must also be taken into account, in particular so that the vehicle can safely drive off the shoulder or can brake.

In some embodiments, it is provided that the tensioning of the at least one safety belt of the restraint system of the vehicle is carried out in a cascaded manner depending on the evaluated dangerous situation. In particular, a tensed state of the at least one safety belt is adjusted depending on the dangerous situation and/or a change in the dangerous situation. In particular, a first tensed state of the at least one safety belt is set upon recognizing the driving on the shoulder, and a second tensed state of the at least one safety belt, which is tighter than the first tensed state, is set depending on the dangerous situation and/or the change in the dangerous situation.

In order to be able to respond and react better to the respective current dangerous situation of driving on the shoulder, the classified dangerous situation can be evaluated by the electronic evaluation unit in order to determine the extent to which the tensioning of the safety belt should be performed. The tensioning of the safety belt can be cascaded or, respectively, carried out in stages. For example, a first stage of automatic safety belt tensioning can initially be carried out when shoulder driving is recognized and, depending on the current or, respectively, future assessment or, respectively, evaluation of the dangerous situation of shoulder driving, subsequent stages of additional safety belt tensioning processes can be carried out. Accordingly for example the safety belt can be secured initially upon the first recognition of shoulder driving and, if driving the shoulder stops immediately, additional stages of belt tensioning can be avoided. This can, for example, prevent a passenger in the vehicle from being subjected to unnecessarily strict belt tensioning even though the current dangerous situation does not yet require it. The belt tensioning can therefore be carried out dynamically and in an intelligent way in different stages or, respectively, levels.

In particular, with the aid of the electronic evaluation unit, the restraint system of the vehicle can be controlled or, respectively, adapted or parameterized in such a way that the current tensed state of the safety belt is automatically adapted depending on the current and/or future dangerous situation. Accordingly, if the electronic evaluation unit determines a higher danger potential, additional tensioning of the safety belt can be performed. In particular, the tensed state of the safety belt can be automatically adjusted, in particular increased, if there is a sudden change in the dangerous situation. This allows improved reaction to the current situation and circumstances so that the protection of passengers in the vehicle can be increased. For example, a first tensed state of the safety belt can initially be set, in particular automatically, upon recognizing shoulder driving. If the dangerous situation has been prioritized higher due to a changed dangerous situation of the shoulder driving and/or a dynamic change in the current situation, the safety belt can be adjusted from the first tensed state to the second and/or a higher tensed state. In particular, the tensed state of the safety belt is tighter in the second tensed state than in the first tensed state. This is particularly more beneficial when a more dangerous situation is detected or, respectively, predicted. For example, the time at which the vehicle enters the shoulder can be considered in this regard. If in this regard a specified time threshold value for driving on the shoulder has also been exceeded, it can be assumed that the danger of an uncontrolled collision and/or an accident is high, so that, for example, immediately automatically, a second tensed state of the safety belt tighter than the first tensed state is automatically set. Consequently, the safety of the passengers in the vehicle can be increased.

In some embodiments, it is provided that at least one piece of information relating to the recognized driving on the shoulder is saved in a digital map, wherein this information is considered in a future evaluation of a dangerous situation of a vehicle driving onto a shoulder, in particular shoulder driving. In particular, the electronic evaluation unit for evaluating the dangerous situation is trained by machine with a machine learning algorithm depending on the digital map and/or other information relating to driving on a shoulder. Consequently, the electronic evaluation unit of the vehicle, and/or of other vehicles, and/or of a fleet server, and/or of another cloud-based system for evaluating and recognizing shoulder driving can be automatically trained by machine. Accordingly, future situations relating to shoulder driving can be better evaluated, and improved safety measures to protect the passengers and other road users can be carried out.

For example, the particular shoulder and the particular danger emanating from this shoulder can be saved in the digital map which is saved for example in a computing unit and/or the electronic evaluation unit. Accordingly, for example, for each shoulder, specific information on the potential dangers of said shoulder can be saved in the digital map. Accordingly, it is possible, for example, to recognize early on that driving on this particular shoulder is particularly dangerous or less dangerous for future potential shoulder driving. Accordingly, improved and more efficient safety measures can be carried out or, respectively, initiated.

For machine training, for example, the electronic evaluation unit can contain a machine learning unit. This can be used to machine-train the evaluation and/or recognition of shoulder driving using machine learning systems and/or machine learning algorithms. A wide variety of information can be used for this purpose. Information such as the location of the shoulder, the length of the shoulder, the width of the shoulder, the type of shoulder and the environmental information on the shoulder are particularly important. The already determined, recognized and performed shoulder driving can also be considered. Information such as the reason for shoulder driving, the duration of shoulder driving, the leaving of shoulder driving, which countermeasures or, respectively, safety measures have been taken, the particular vehicle type, the employed safety measures and/or driver assistance systems to end shoulder driving or the widest range of information regarding shoulder driving can be taken into account. This wealth of possible information can be used to recognize and evaluate future shoulder driving early on and make it safer.

For example, a digital map can be generated or, respectively, built up with dangerous situations relating to shoulder driving in which non-critical and critical shoulder driving occurs. With non-critical shoulder driving, especially on non-critical shoulders, threshold values for intervention at usual speeds can be increased. If necessary, shoulder interventions can also be completely eliminated. In the case of critical shoulder driving, a situation analysis could be carried out of what led to the critical shoulder driving, and in so doing, similar situations could be filtered and corresponding threshold values for an intervention could be adjusted.

In the learning algorithm of the machine learning unit, the cause of leaving the roadway could be recognized by perceiving the surroundings of other road users, for example. For example, this can originate from passing oncoming traffic, stationary vehicles or other traffic observers. If swerving onto the shoulder takes place in an appropriate manner, in particular at a controllable speed, or at a known location using the digital maps, the shoulder reaction can be suppressed or only started at higher threshold values.

The combination with roadway friction values is also useful here. If the friction value recognized by the vehicle on the shoulder deviates significantly downwards from the friction values of the street, the shoulder interventions could be carried out early on. In particular, this can be carried out by cloud applications or vehicle estimates before leaving the road.

Moreover, if there is an uneven roadway based on the digital map, the threshold for recognizing a shoulder can be set higher due to the vertical acceleration. This serves to prevent false triggering of the safety measures due to an uneven roadway such as cobblestones. This can be trained in particular with the aid of the machine learning unit.

For example, the just described procedure is a computer-implemented or cloud-based method. For example, a corresponding computer program can be used to carry out such a method. For example, the electronic evaluation unit can have computing units and/or processors with which such a method can be carried out, for example.

Another aspect relates to an electronic vehicle guidance system with a detection unit and an electronic evaluation unit, wherein the electronic vehicle guidance system is designed to carry out any method or embodiment thereof described herein. In particular, the method described in the preceding or a beneficial embodiment of the method is carried out with the just described vehicle guidance system.

For example, the electronic vehicle guidance system can be an electronic system and/or an electronic unit. In particular, the electronic vehicle guidance system is a driver assistance system.

For example, the electronic vehicle guidance system can be integrated in a vehicle. It can also exist as a cloud-based solution external to the vehicle, and the corresponding information, data and signals can be exchanged and transmitted via communication paths.

Another aspect relates to a vehicle with an electronic vehicle guidance system as described herein or any embodiment thereof.

For example, the vehicle is a motor vehicle such as a passenger car, or a truck, or other vehicle. For example, the vehicle can be a highly automated vehicle. It can, for example, be designed as a fully autonomously operated or semi-autonomously operated vehicle.

Also belonging to the invention are embodiments of the electronic vehicle guidance system and of the vehicle that have features which have already been described in conjunction with the embodiments of the method. For this reason, the corresponding developments of the electronic vehicle guidance system and of the vehicle are not described again.

The invention also includes combinations of the features of the described embodiments.

Reference will now be made to the drawings in which the various elements of embodiments will be given numerical designations and in which further embodiments will be discussed.

In the embodiments described herein, the described components of the embodiments each represent individual features that are to be considered independent of one another, in the combination as shown or described, and in combinations other than shown or described. In addition, the described embodiments can also be supplemented by features other than those described.

Specific references to components, process steps, and other elements are not intended to be limiting. Further, it is understood that like parts bear the same or similar reference numerals when referring to alternate FIGS.

Figure 1:
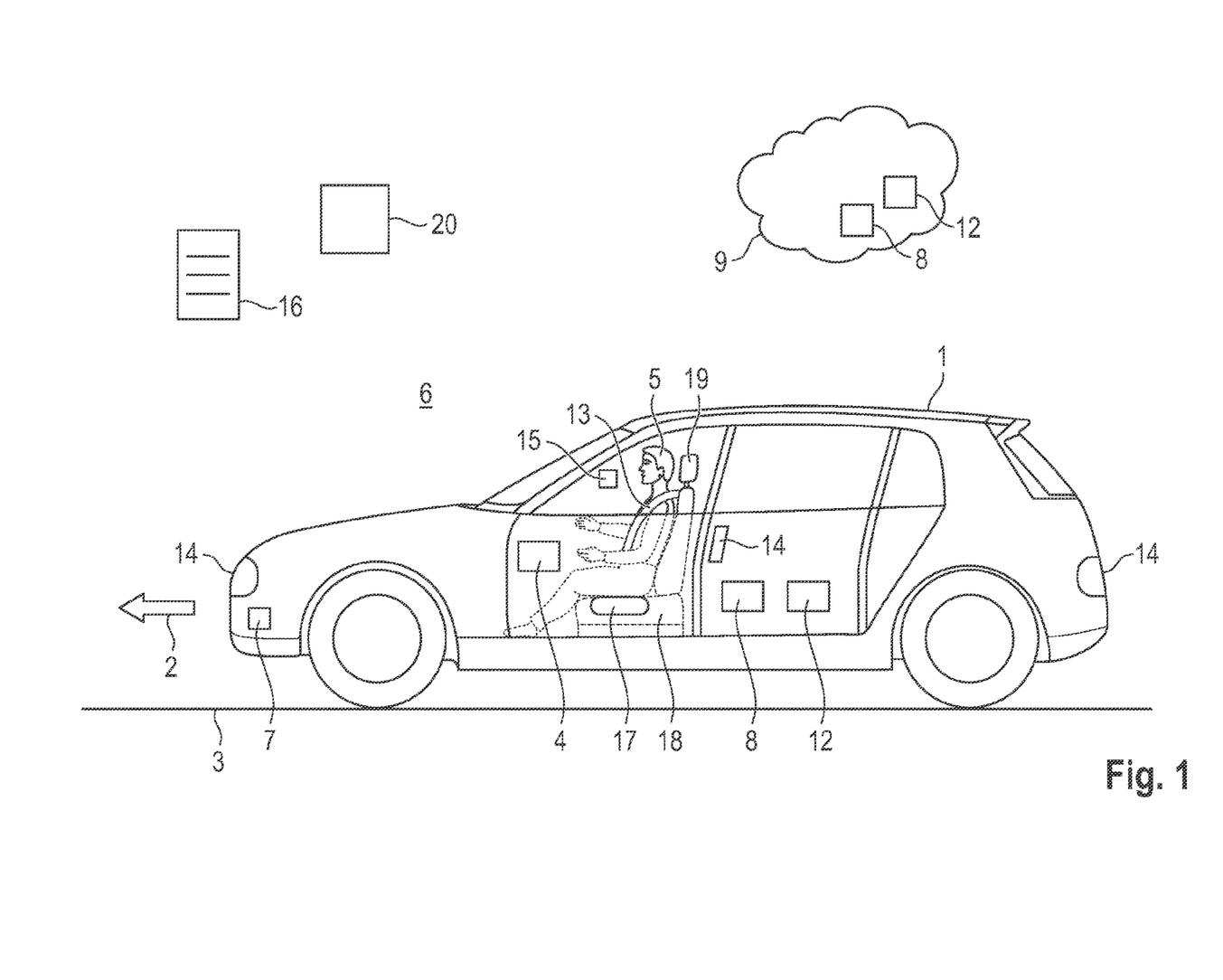
FIG. 1 shows a schematic representation of an example vehicle with an electronic vehicle guidance system.

FIG. 1 shows, for example, a schematic representation of a vehicle 1 that is engaged in locomotion 2 along a roadway 3.

For example, the vehicle 1 is a highly automated vehicle, in particular a vehicle that is operated fully autonomously or semi-autonomously. In particular, the vehicle 1 is a motor vehicle. The vehicle 1 can perform real locomotion 2 along the roadway 3 in road traffic. The roadway 3 can be, for example, a country road, or a highway, or a multi-lane federal highway. In particular, the roadway 3 can be a roadway of any street.

For example, the vehicle 1 can have an electronic vehicle guidance system 4. With the aid of the electronic vehicle guidance system 4, in particular a driver 5 of the vehicle 1 can be supported, in particular assisted, while driving the vehicle 1. Consequently, the electronic vehicle guidance system 4 can be one or more electronic driver assistance systems. It is also conceivable that the electronic vehicle guidance system 4 is integrated directly in the vehicle 1, in particular in the electronic vehicle electrical system, or the electronic vehicle guidance system 4 is designed as a cloud-based system external to the vehicle 1, and the corresponding applications are exchanged or, respectively, transmitted between this system and the vehicle 1 via wireless communication links.

In order to be able to provide automatic, automated assistance to the driver 5 of the vehicle 1, it is beneficials if a surrounding area in an environment 6 of the vehicle 1 is continuously detected or, respectively, monitored by at least one detection apparatus 7 of the vehicle 1. The detection apparatus 7 can, for example, be sensors, cameras or detection systems.

An electronic evaluation unit 8 is provided in particular to be able to enable the electronic vehicle guidance system 4 to intervene in the driving behavior of the vehicle 1 with corresponding signals, in particular instructions. The electronic evaluation unit 8 can in particular be designed as an evaluation system consisting of a plurality of individual computing units and/or processor units. The electronic evaluation unit 8 can either be integrated in the vehicle 1 or made available externally as a cloud-based application. In this case, the electronic evaluation unit 8 can be used in a cloud-based system 9. Corresponding signals and/or information from the electronic evaluation unit 8 can be transmitted to the vehicle 1 via respective communication connections. It is also possible for the electronic evaluation unit 8 to be integrated directly in the vehicle 1 in the electronic vehicle guidance system 4.

The cloud-based system 9 can, for example, be a data cloud and/or a server system.

For example, the electronic vehicle guidance system 4 can support the driver 5 of the vehicle 1 during possible shoulder driving. When driving on the shoulder, the vehicle 1 leaves the currently driven street, i.e. the roadway 3. This is especially problematic because the regions next to the road usually have a lower friction coefficient. For this purpose, the driver 5 can be assisted by corresponding shoulder functions, such as an electronic stabilization system, so that safely steering the vehicle 1 back onto the road can be established. This can be done, for example, by the electronic vehicle guidance system 4. Without such support, many drivers turn the steering too much without sufficient lateral acceleration building up. The cause of this is the low friction values next to the street. If in this case the vehicle 1 returns to the roadway 3 and drives on a surface with a higher friction value, the lateral dynamics of the vehicle 1 can suddenly drastically increase, which can frequently result in accidents with oncoming traffic or accidents on the side of the roadway on the opposite side. To be able to prevent this, the proposed method and in particular the electronic vehicle guidance system 4 are particularly useful. This allows automatically performance of safety measures when driving with the vehicle 1 on a shoulder 10 (see FIG. 2) that is different from the roadway 3. The shoulder 10 is in particular a specified, in particular narrow, region on the side of the roadway 3.

The following FIGS. explain various dangerous shoulder driving situations and, in particular, the safety measures to be taken in response.

Figure 2:
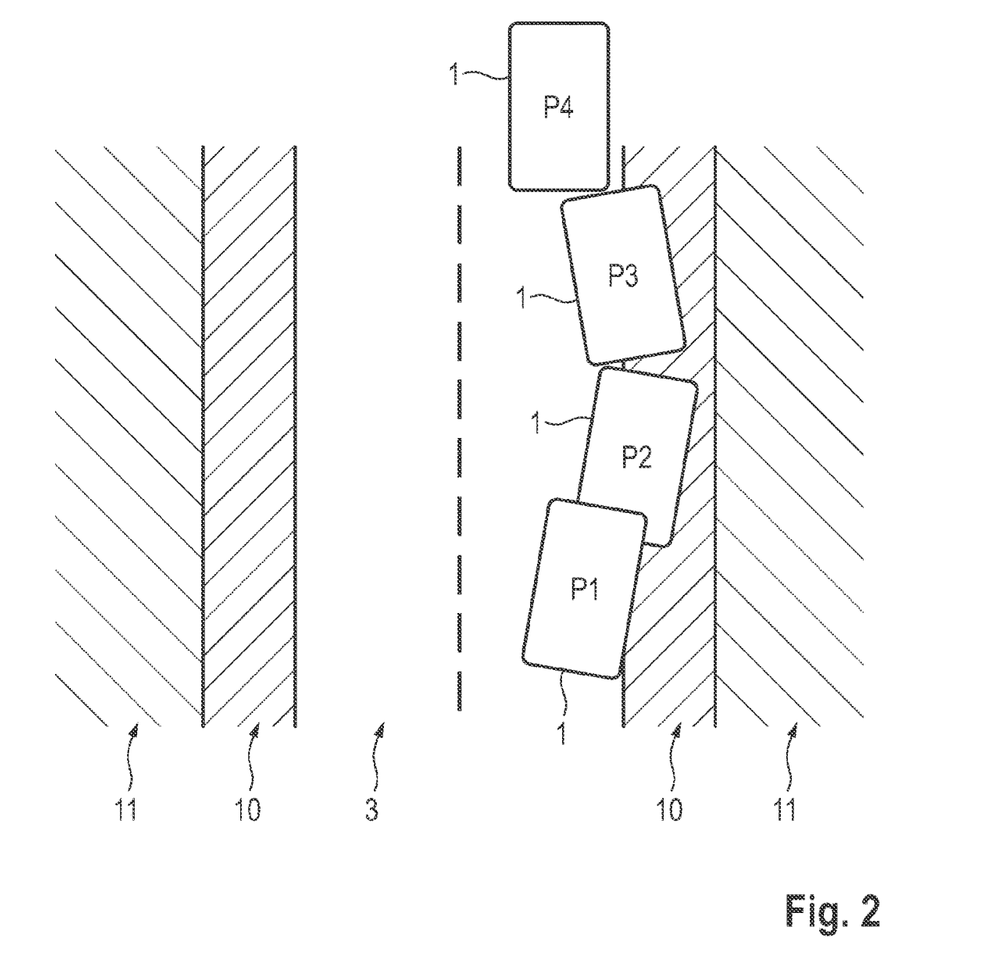
FIG. 2 shows an example embodiment of a possible safety measure when driving on a shoulder with the vehicle of FIG. 1.

FIG. 2 shows a possible situation-related dangerous situation of shoulder driving. First of all, it can be recognized here that the shoulder 10 is arranged directly on the sides of the edge areas or, respectively, sides of the roadway 3. In particular, there is a smooth transition between the roadway 3 and the shoulder 10. In particular, the shoulder 10 is arranged so as to run adjacent to, in particular run parallel to, the roadway 3. Directly on the sides of the shoulder 10 facing away from the roadway 3, there is in each case a region 11 different from the shoulder 10. The shoulder 10 is therefore bordered on the one hand by the roadway 3 and on the other by the region 11. For example, the region 11 is an unpaved street, or unpaved ground, or a field path, or a bicycle path, or a pedestrian path.

For example, in a normal instance, the vehicle 1 can be prevented from leaving lane 3 by a lane keeping system, in particular a lane assist system. However, this is not always the case since system failures or unforeseeable traffic situations cannot prevent departure from the lane 3. For example, a current steering torque of the lane assist may not be enough to prevent the departure from the lane 3, because for example the driver 5 can partially oversteer it, or because sufficient cornering control may no longer exist in dynamic situations in curves.

Consequently, it is important for a tailored driving reaction to be provided in shoulder driving. This can be done, for example, by the electronic vehicle guidance system 4. In addition or instead, the electronic vehicle guidance system 4 can, for example, have a pre-crash function which can secure a driver in accidents. Pre-crash measures are additional preparations for vehicles and vehicle occupants in the event that a situation ends in an accident.

First of all, using the detection apparatus 7, the shoulder 10 in the environment 6 of the vehicle 1, can be detected in particular continuously. This information can, for example, be made available to the electronic evaluation unit 8. In addition, information relating to a position and/or a type of the shoulder 10 can be provided, in particular transmitted, to the vehicle 1 and/or the electronic evaluation unit 8. By using this information, the electronic evaluation unit 8 can, for example, determine or, respectively, recognize whether shoulder driving exists, i.e., the vehicle 1 is driving on the shoulder 10. In addition or instead of this, additional information and/or data can be used for determining or, respectively, recognizing when the vehicle 1 is driving on the shoulder 10. On the one hand, information on the environment 6 can be used for this purpose. Information concerning objects such as trees, guardrails, lampposts, other road users or other environmental information can be taken into account. Of major importance is, in particular, the information concerning the shoulder 10. In this regard, the surface quality, the dimensions of the shoulder 10, a width of the shoulder 10, an incline or slope of the shoulder 10 or the region 11 that is different from the shoulder are of particular importance.

A position of the vehicle 1 can also be determined by means of a position determining unit 12 (see FIG. 1). The position determining unit 12 can either be integrated in the vehicle 1 or a component of the cloud-based system 9. With this, on one hand, the position of the vehicle 1 can be determined, for example via GPS, and with the position, in particular the geographical position, of the shoulder 10. Accordingly, a matching or, respectively, comparison can be carried out between the current position of the vehicle 1 and the shoulder 10, so that from this, it can be determined whether the vehicle 1 is completely or partially on the shoulder 10. It is then particularly important if the vehicle 1 is already on the shoulder 10 with at least one tire. The more tires of the vehicle 1 are on the shoulder 10, the greater the danger of shoulder driving.

With the aid of the electronic evaluation unit 8, it can be determined or, respectively, ascertained using the environmental information, and/or the position information, and/or the information already mentioned in various ways whether shoulder driving currently exists. Another way of identifying shoulder driving is to compare friction values or, respectively, friction coefficients of the surface on which the vehicle 1 is currently driving. In particular, the shoulder 10 has a different material in comparison to the roadway 3. In particular, the roadway 3 is a surface with concrete or asphalt or a paved surface. The shoulder 10 is usually a gravel-covered or earth-covered region so that the friction values of the shoulder are many times worse or, respectively, less in comparison to the roadway 3. By using such a comparison of the friction values, it can also be determined whether at least one tire of the vehicle 1 is on the shoulder 10. This is done in particular with the aid of the electronic evaluation unit 8.

FIG. 2 shows the position P1 at which the vehicle 1 is moving toward the shoulder 10 and consequently at least partially leaving the roadway 3. This leaving of the roadway 3 can be determined by means of the electronic evaluation unit 8. As soon as this exists, the extent to which a dangerous situation of shoulder driving exists can be evaluated or, respectively, processed by means of the electronic evaluation unit 8. A dangerous situation is to be understood as one that is specifically or, respectively, explicitly accompanied by the vehicle 1 driving on the shoulder 10 and/or can accompany the same in the future. Consequently, with the aid of the electronic evaluation unit 8, not only can the current driving on the shoulder 10 be determined and evaluated, but a prediction can be made using a wide range of information of the extent to which shoulder driving could become even more dangerous. Depending on the evaluated dangerous situation, safety measures can be automatically initiated and, in particular, carried out. This can occur, for example, at position P2 of vehicle 1 in FIG. 2. For example, in this case, an automatic tensioning of at least one safety belt 13 of a restraint system 14 of the vehicle 1 can be performed. In other words, for example, the safety belt of the driver 5 is tensioned. In particular, all occupants of the vehicle 1 can be stabilized via their respective safety belt or, respectively, restraint belt by tensioning the respective belt in the respective seat. For example, in so doing, the driver 5 and the occupants of the vehicle 1 can be automatically secured by moderate belt tensioning. On the one hand, this yields the benefit that the occupants are protected or, respectively, secured in a potential accident, especially if unevenness arises. And on the other hand, the tensioning of the respective belt raises the awareness of the occupants, in particular the driver 5. Accordingly, for example, the driver 5 can be made aware of the current dangerous situation with regard to the shoulder 10.

In addition to carrying out the safety measures, in particular the belt tensioning, an active cruise control system, in particular an ACC control function, of the vehicle 1 can be deactivated, for example, since automatic speed adjustment can no longer be safely carried out on the unknown terrain of the shoulder 10. Careful deceleration or, respectively, braking can also be carried out here as a safety function.

However, an emergency function should exist since it can be desired, for example, for the driver 5 to intentionally drive onto the shoulder 10 due to unforeseeable traffic situations and/or other circumstances. It should therefore be possible for the driver 5 to override system interventions at any time.

As an additional safety measure, depending on the dangerous situation, road users in the environment 6 of the vehicle 1 can be warned of the dangerous situation with regard to the vehicle 1 driving on the shoulder. For this purpose, for example, road users can be warned automatically by a lighting apparatus 14 of the vehicle 1 by visual warnings. The lighting apparatus 14 can be a hazard warning light system of the vehicle 1 so that road users in the environment 6 can be warned by the hazard warning light shining, and can therefore be informed attentively of the currently prevailing dangerous situation. Likewise, the other road users can be warned in parallel by acoustic warning signals which can be output by loudspeaker systems of the vehicle 1. Moreover, the occupants of the vehicle 1 can also be warned acoustically, and/or visually, and/or haptically upon the detection of shoulder driving. For this purpose, corresponding warnings can be output in the vehicle 1, in particular in the passenger compartment. This can be done, for example, by an output unit 15. The output unit 15 can be, for example, an infotainment system, or a screen, or a loudspeaker system of the vehicle 1. Likewise, the output unit 15 could be a mobile device such as a smartphone, or a tablet, or a smartwatch of the driver 5 or one of the occupants of the vehicle 1.

Moreover, the occupants of the vehicle 1 are warned of the current dangerous situation by the haptic tensioning, i.e. by means of reversible belt tensioning. For example, a reaction of the driver 5 has been carried out in position P3 of the vehicle 1. In doing so, the driver 5 steers the vehicle 1 toward the roadway 3 in order to leave the shoulder 10. This steering of the driver 5 may be dangerous under certain circumstances. For example, this may be a sudden overtaxing of the driver 5 so that he performs uncontrolled actions, for example, very strong steering. In this case, a braking process could also be initiated. In particular, this occurs after the belt tensioning since the driver 5 has now been made aware. In particular, this can occur within a short time period after the safety belt tensioning since, given a longer duration, the driver 5 probably has more time to consider a corresponding countermeasure. This can be monitored by a driver monitoring system of the vehicle 1. For example, shortly after the belt tensioning, a lower time threshold value could be specified for the detection of a panic reaction by the driver 5, for example to release ESC stabilization interventions. For example, the front wheel of the vehicle 1 on the outside of the curve can be braked by means of ESC braking. There can also be steering angle reductions by steer-by-wire.

So that the above-described problems can be better evaluated, a classification database 16 can be used or, respectively, consulted for the evaluation of the dangerous situation of shoulder driving. The classification database 16 can be, for example, its own external data cloud or an external data server in which is saved extremely comprehensive information on dangerous situations, procedures, events, the causes of accidents, and the results of accidents of shoulder driving. Based on this extremely diverse information in the classification database 16, for example, the electronic evaluation unit 8 can better evaluate the current dangerous situation of present or future shoulder driving. In this case, in particular a danger ranking and/or a danger level of the current shoulder driving can be better estimated or, respectively, evaluated. In this case, for example, the current dangerous situation can be classified so that the dangerous situation of shoulder driving can be assigned to a first dangerous scenario according to a first class, or at least to a second dangerous scenario to a according second class. Accordingly, the current dangerous situation is classified so that stronger safety measures can be initiated and carried out, especially in the case of high potential danger. In particular, the current dangerous situation can be classified faster and more efficiently by means of the specified dangerous situations in the database. Depending on the performed classified dangerous situation, at least one electronic driver assistance system, in particular the electronic vehicle guidance system 4, can be dynamically adapted or, respectively, parameterized. In the exemplary embodiment in FIG. 2, this could be, for example, the dynamic adjustment of an electronic stability program ("ESC"). With the aid of this system, despite the strong counter steering of the driver 5, a safe return of the vehicle 1 to the roadway 3 can be achieved. In addition, a cascaded belt tensioning can be carried out in this context depending on the classified dangerous situation. In addition to the already performed belt tensioning, i.e., a first belt tensioning, an additional, in particular partial tensioning of the safety belt 13 can also be carried out. In particular, a tensed state of the safety belt 13 can be automatically adjusted depending on the evaluated or, respectively, classified hazardous situation. In particular, depending on the already performed first tensed state in the first belt tensioning, a tighter or, respectively, stronger tensed state with respect to the first can be automatically set. Therefore, depending on the respective classified dangerous situation, a wide range of tensed states of the safety belts of the vehicle 1 can be set, in particular dynamically adjusted.

This cascaded belt tensioning can, in particular, take into account the respective currently existing or, respectively, estimated dangerous situation as well as a change in the dangerous situation. In particular, by means of the electronic vehicle guidance system 4 and in particular the associated systems, in particular the electronic evaluation unit, a permanent analysis or, respectively, calculation of the currently existing dangerous situation can be made. This allows an immediate reaction to any occurring changes in the hazardous situation. In particular, predicted dangerous situations also play a role. In this case, the electronic evaluation unit 8 can make a prediction about the shoulder driving in the present subsection of the shoulder 10 by using current data and provided information.

An additional safety measure provided for this purpose is the closing of all windows of the vehicle 1 and the sunroof of the vehicle 1, if available. Accordingly, the passengers of the vehicle 1 can be secured as best as possible in a possible collision and/or accident.

In addition, a stabilization of a seating position of the passengers, in particular the driver 5, can be carried out as an additional safety measure. For example, for this purpose, lateral elements 17 of a vehicle seat 18 can be dynamically adjusted. For example, they can be inflated by applying compressed air so that the driver 5 is stabilized in the transverse direction of the vehicle. Accordingly on the one hand, the driver 5 is secured by the belt tensioning in the longitudinal direction of the vehicle, and in the transverse direction of the vehicle, he is stabilized or, respectively, secured via the set lateral elements 17 of the vehicle seat 18.

Also, such elements can be adjusted in a headrest element 19 of a headrest of the vehicle seat 18. Accordingly, the driver 5 can be optimally protected.

In the exemplary embodiment of FIG. 2, the position P4 of the vehicle 1 indicates that the vehicle 1 has safely reached the roadway 3 so that this shoulder driving was able to be safely defused, in particular this situation was able to be de-escalated. In this case, the previously pursued safety measures can be deactivated and withdrawn. In particular, the safety belt 13 can be returned to the original state.

Figure 3:
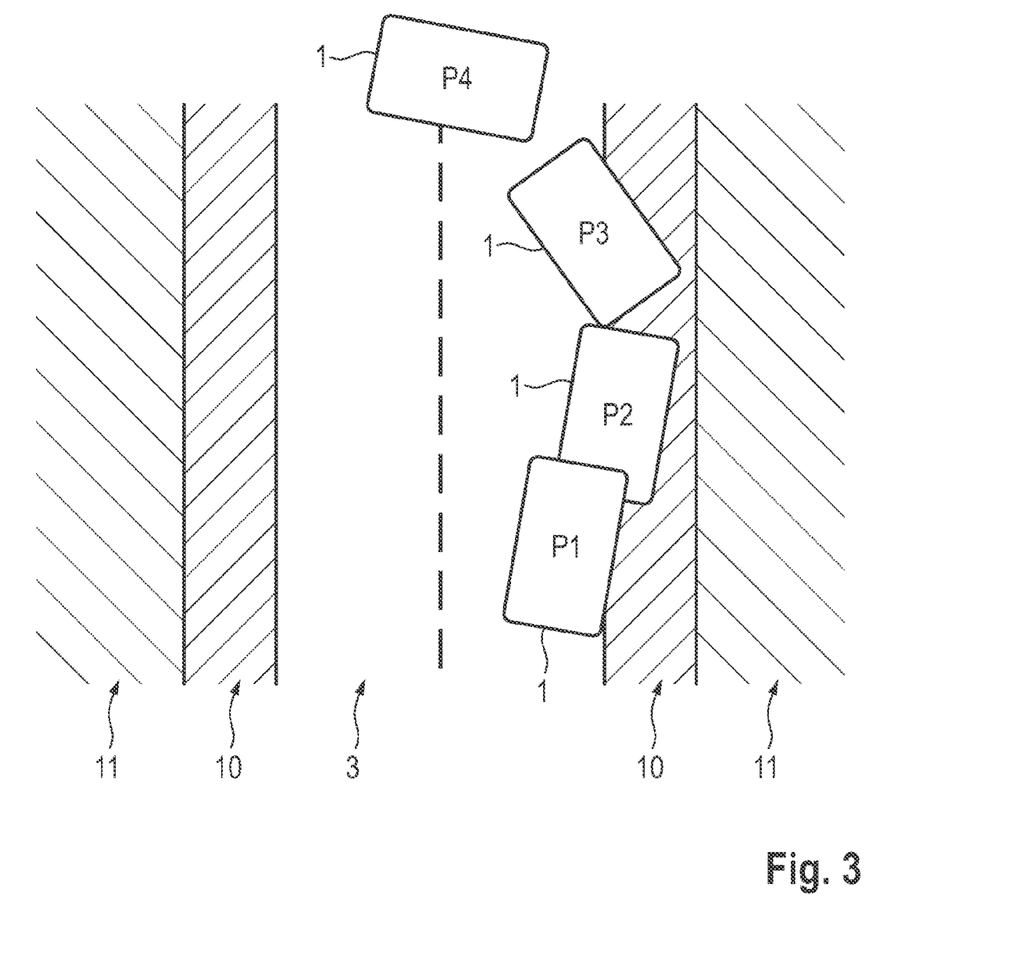
FIG. 3 shows another example embodiment of a possible safety measure when driving on a shoulder with the vehicle of FIG. 1.

In the following FIG. 3, another possible dangerous scenario or, respectively, dangerous situation of shoulder driving is shown. Here the vehicle is also leaving the roadway 3 and is driving onto the shoulder 10. In this case, the respective situations in the positions P1, P2 and P3 are identical as in the embodiments of FIG. 2. In this case, the dangerous situation is much greater because, as schematically shown in the comparison between the positions P3 and P4 of the vehicle, the vehicle 1 is leaving the shoulder 10 dynamically and threatens to drive into oncoming traffic or toward the other edge of the roadway. This is determined in particular by the electronic vehicle guidance system 4 and in particular by the electronic evaluation unit 8. If this is the case, this will lead, for example, to the enhancement of the pre-crash measures. The ESC functionality remains normally stabilizing. If necessary, a strong deceleration of the vehicle 1 can be initiated. In particular, due to the dynamics of the vehicle 1, in particular from exceeding limit values, this causes the vehicle 1 to swerve or, respectively, skid. This can no longer be remedied by the driver 5 alone. In this case, the surrounding area of the vehicle 1 can first be detected with the aid of the detection apparatus 7 so that the current dangerous situation can be reassessed. In addition, in this case, a reversible tensioning of the seat belts of the vehicle 1 is carried out with significantly higher forces to prevent the passengers of the vehicle 1 from shifting. The other above-described security measures are also activated and maintained in this case. In addition, hazard braking, in particular emergency braking, at least one deceleration process of the vehicle 1 can now be automatically initiated and performed. This allows safe stopping of the vehicle 1 to be achieved.

As an additional option, the electronic vehicle guidance system 4 could set the steering option or, respectively, a steering angle so that the driver 5 cannot steer as hard as he likes. Such extreme situations could thereby be avoided. Likewise by means of electronic driver assistance systems, a spinning of the wheels can be minimized or, respectively, prevented.

Figure 4:
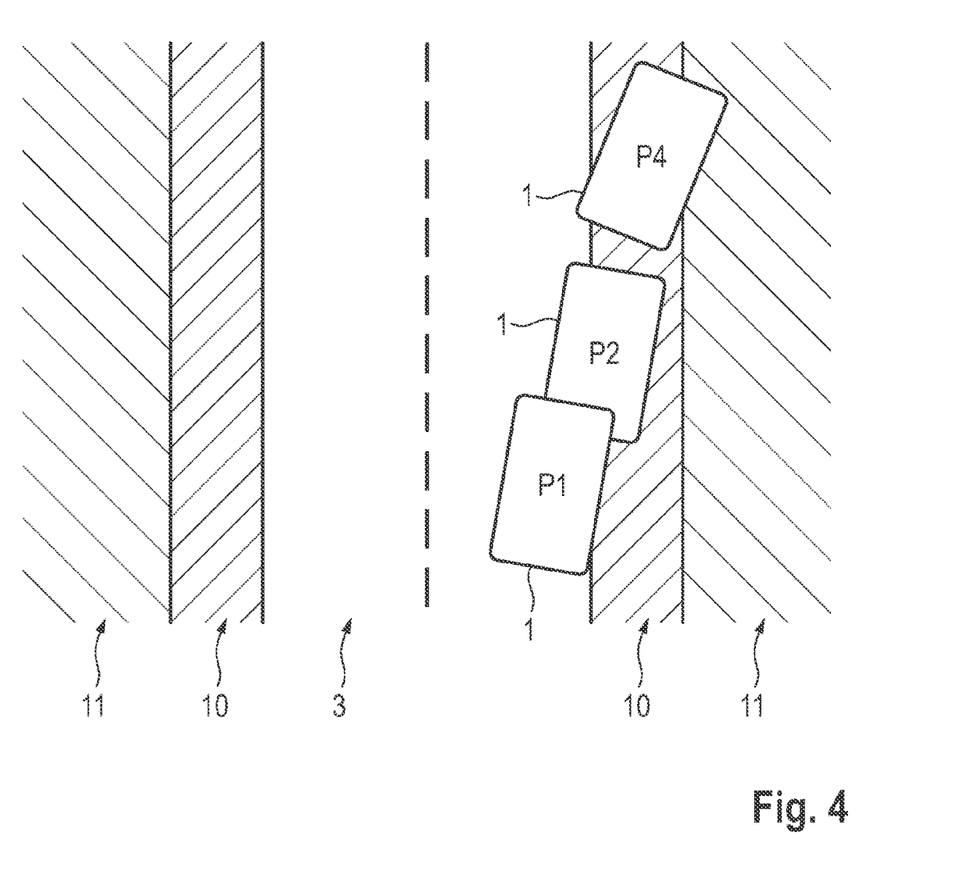
FIG. 4 shows another example embodiment of a possible safety measure when driving on a shoulder with the vehicle of FIG. 1.

In FIG. 4, only one other possible dangerous scenario is shown. An elevated dangerous situation is now shown here since the vehicle 1 is completely off the roadway 3, and complete control of the vehicle 1 may be lost. The individual safety measures, as already listed above for the respective vehicle positions P1 and P2, are also active here, in particular with regard to described the safety measures. However, the measure regarding position P3 is omitted here because in this case, there is no reaction by the driver 5. For example, the driver is currently inattentive or the driver 5 nodded off for a moment, for example. In this case, no return of the vehicle 1 to the roadway 3 occurs so that the vehicle 1 is initially driving completely on the shoulder 10 and possibly also on the region 11. In particular, in this embodiment, besides the above-described embodiment, a duration can be determined, in particular a timer of the electronic evaluation unit 8 is started, upon recognition of shoulder driving or, respectively, driving on the shoulder 10 to determine the duration of how long the vehicle 1 has already been driving on the shoulder 10. In this case, upon reaching a time threshold value, it can be decided by the system that no countermeasures and/or reactions of the driver 5 will occur. In this case, after exceeding a predetermined duration and after no reactions by the driver 5, immediate emergency braking of the vehicle 1 can result. This can prevent something worse since the vehicle can automatically be brought immediately to a stop.

Especially in this exemplary embodiment and of course in all other exemplary embodiments, obstacles such as a tree or a guardrail or another obstacle may arise while driving longer on the shoulder 10 or the region 11. Monitoring the obstacles in front of the vehicle by the detection apparatus 7 is particularly important. This information regarding any obstacles is particularly important for the emergency braking process or, respectively, the deceleration process. In this case, it can also be taken into account that the friction values on the shoulder 10 and the region 11 are significantly less and worse. Accordingly, an emergency deceleration must be initiated early in order to provide a sufficiently safe braking distance. If the driver 5 evades the obstacle, the system can attempt to follow this new trajectory. The system can also determine whether evasion is still possible. For the evasion, for example, increased lateral dynamics can be allowed by the electronic vehicle guidance system 4. Should, as shown in FIG. 3, driving into the oncoming traffic occur, the system can set a reduction of the transverse dynamics of the vehicle so that entry into the opposite lane can be minimized. The lateral dynamics can be realized, for example, by wheel-selective ESC interventions or by a steering angle limitation in steer-by-wire.

If evasion or, respectively, stopping is no longer possible, the braking process of the vehicle 1 is prioritized in order to reduce the impact energy. In this case, the change between the roadway 3 and the shoulder 10 can be observed by the detection apparatus 7 because a greater longitudinal deceleration may be necessary due to slightly greater lateral support, e.g. only one wheel is still on the roadway 3.

In any case, the automatic belt tensioning is beneficial since the high belt forces combined with the maximum controlled force exerted by the seat belt 13 can ensure that the occupants in the respective positions in the vehicle seat 18 are not shifted forward even during a braking process. Accordingly, the safety of vehicle passengers can be increased. For example, if there is no obstacle in front of a vehicle 1 and the driver 5 still steers out of the shoulder 10 later, a conscious wish by the driver 5 can initially be assumed. Since skidding should nevertheless be prevented here, it is recommended to allow the shoulder function of the electronic vehicle guidance system 4 to act with stricter engagement limits or with a reduced intensity of intervention.

In particular, by the described exemplary embodiments in FIGS. 1 to 4, a coordinated procedure between a shoulder function, in particular an ESC function, and a pre-crash measure can be established. In particular, by simultaneously securing the passengers by the automatic belt tensioning and the attention trigger which therefore occurs, the safety of the passengers can be increased during shoulder driving.

Due to the wide range of information and the classification of the dangerous situation, risks can be minimized during shoulder driving, even in the event of obstacles on the shoulder or oncoming traffic.

For example, in vehicles with steer-by-wire, it can be useful to ease off the steering slightly when transitioning from the shoulder 10 back onto the roadway 3 due to friction value differences. This reduces the increased lateral acceleration when driving onto the roadway 3.

In particular, the exemplary embodiments indicate improved coordinated behavior of the functions when driving onto the shoulder 10.

For example, the safety measures become relevant when the vehicle 1 is traveling at a speed between 50 km/h and 100 km/h, in particular 120 km/h.

LIST OF REFERENCE NUMERALS

1 Vehicle
2 Locomotion
3 Roadway
4 Electronic vehicle guidance system
5 Driver
6 Environment
7 Detection apparatus
8 Electronic evaluation unit
9 Cloud-based system
10 Shoulder
11 Region
12 Position determining unit
13 Safety belt
14 Restraint system
15 Output unit
16 Classification database
17 Seat element
18 Vehicle seat
19 Headrest element
20 Information point
P1-P4 Positions The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout: the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for of automatically carrying out safety measures when a vehicle drives on a shoulder different from a roadway comprising:
    detecting the shoulder which differs from the roadway and laterally adjoins the roadway by a detection circuit of the vehicle;
    providing information regarding the position and/or type of the shoulder to the vehicle;
    recognizing that the vehicle is driving on the shoulder using an electronic evaluation circuit;
    evaluating a dangerous situation which accompanies the driving of the vehicle on the shoulder and/or can accompany the same in the future, using the electronic evaluation circuit;
    carrying out a safety measure by tensioning at least one safety belt of a restraint system of the vehicle depending on the evaluated dangerous situation; and
    informing the driver about the tensioning of the at least one safety belt.

2. The method of claim 1, wherein the detection circuit is used to detect a surrounding area in an environment of the vehicle and/or a position determining circuit is used to determine a current position of the vehicle, wherein depending on the detected surrounding area and/or on the determined position, the electronic evaluation circuit recognizes if the vehicle is at least partially on the shoulder.

3. The method of claim 1, wherein depending on the evaluated dangerous situation, road users in the environment of the vehicle are visually warned by a lighting circuit of the vehicle, in particular before the vehicle drives onto the shoulder, in particular, depending on the evaluated dangerous situation, an acoustic and/or visual and/or haptic warning is output to a driver of the vehicle by an electronic output.

4. The method of claim 1, wherein a classification database is consulted for evaluating the dangerous situation of the recognized driving on the shoulder, wherein the dangerous situation is classified using the classification database so that the dangerous situation of driving on the shoulder can be assigned to a first dangerous scenario according to a first class, or at least to a second dangerous scenario according to a second class.

5. The method of claim 4, wherein depending on the classified dangerous situation, at least one electronic driver assistance system is dynamically adapted so that additional safety measures are automatically initiated, with the at least one electronic driver assistance system, in particular, a stabilization of a seating position of at least one passenger of the vehicle in a vehicle seat is carried out as another safety measure, in particular a duration of the driving on the shoulder is determined when the driving on the shoulder by the vehicle is detected, wherein a deceleration process, in particular an emergency braking process, of the vehicle is automatically carried out if a specified threshold value is exceeded by the determined duration.

6. The method of claim 1, wherein in order to evaluate the dangerous situation of driving on the shoulder, a region in the environment of the shoulder different from the roadway and the shoulder which directly abuts the shoulder is taken into account, in particular, this region is also detected by the detection circuit.

7. The method of claim 1, wherein the tensioning of the at least one safety belt of the restraint system of the vehicle is carried out in a cascaded manner depending on the evaluated dangerous situation, in particular, a tensed state of the at least one safety belt is adjusted depending on the dangerous situation and/or a change in the dangerous situation, in particular, a first tensed state of the at least one safety belt is set upon recognizing the driving on the shoulder, and a second tensed state of the at least one safety belt, which is tighter than the first tensed state, is set depending on the dangerous situation and/or the change in the dangerous situation.

8. The method of claim 1, wherein at least one piece of information relating to the recognized driving on the shoulder is saved in a digital map, wherein this information is taken into account in a future evaluation of a dangerous situation of a vehicle driving on a shoulder, in particular, the electronic evaluation circuit for evaluating the dangerous situation is trained by machine with a machine learning algorithm depending on the digital map and/or other information relating to driving on a shoulder.

9. An electronic vehicle guidance system with a detection circuit and an electronic evaluation circuit, wherein the electronic vehicle guidance system is configured to:
- detect, using the detection circuit, the shoulder which differs from the roadway and laterally adjoins the roadway;
- provide information regarding the position and/or type of the shoulder to the vehicle;
- recognize that the vehicle is driving on the shoulder using the electronic evaluation circuit;
- evaluate a dangerous situation which accompanies the driving of the vehicle on the shoulder and/or can accompany the same in the future, using the electronic evaluation circuit; and
- carry out a safety measure by tensioning at least one safety belt of a restraint system of the vehicle depending on the evaluated dangerous situation; and
- inform the driver about the tensioning of the at least one safety belt.

10. A vehicle with the electronic vehicle guidance system of claim 9.

11. The method of claim 2, wherein a friction coefficient of a ground region on which the vehicle is currently driving is determined, wherein the specific friction coefficient is taken into account for the recognition of driving on the shoulder.

12. The electronic vehicle guidance system of claim 9, wherein the detection circuit is used to detect a surrounding area in an environment of the vehicle and/or a position determining circuit is used to determine a current position of the vehicle, wherein depending on the detected surrounding area and/or on the determined position, the electronic evaluation circuit recognizes if the vehicle is at least partially on the shoulder.

13. The electronic vehicle guidance system of claim 9, wherein depending on the evaluated dangerous situation, road users in the environment of the vehicle are visually warned by a lighting circuit of the vehicle, in particular before the vehicle drives onto the shoulder, in particular, depending on the evaluated dangerous situation, an acoustic and/or visual and/or haptic warning is output to a driver of the vehicle by an electronic output.

14. The electronic vehicle guidance system of claim 9, wherein a classification database is consulted for evaluating the dangerous situation of the recognized driving on the shoulder, wherein the dangerous situation is classified using the classification database so that the dangerous situation of driving on the shoulder can be assigned to a first dangerous scenario according to a first class, or at least to a second dangerous scenario according to a second class.

15. The electronic vehicle guidance system of claim 9, wherein depending on the classified dangerous situation, at least one electronic driver assistance system is dynamically adapted so that additional safety measures are automatically initiated, with the at least one electronic driver assistance system, in particular, a stabilization of a seating position of at least one passenger of the vehicle in a vehicle seat is carried out as another safety measure, in particular a duration of the driving on the shoulder is determined when the driving on the shoulder by the vehicle is detected, wherein a deceleration process, in particular an emergency braking process, of the vehicle is automatically carried out if a specified threshold value is exceeded by the determined duration.

16. The electronic vehicle guidance system of claim 9, wherein in order to evaluate the dangerous situation of driving on the shoulder, a region in the environment of the shoulder different from the roadway and the shoulder which directly abuts the shoulder is taken into account, in particular, this region is also detected by the detection circuit.

17. The electronic vehicle guidance system of claim 9, wherein the tensioning of the at least one safety belt of the restraint system of the vehicle is carried out in a cascaded manner depending on the evaluated dangerous situation, in particular, a tensed state of the at least one safety belt is adjusted depending on the dangerous situation and/or a change in the dangerous situation, in particular, a first tensed state of the at least one safety belt is set upon recognizing the driving on the shoulder, and a second tensed state of the at least one safety belt, which is tighter than the first tensed state, is set depending on the dangerous situation and/or the change in the dangerous situation.

18. The electronic vehicle guidance system of claim 9, wherein at least one piece of information relating to the recognized driving on the shoulder is saved in a digital map, wherein this information is taken into account in a future evaluation of a dangerous situation of a vehicle driving on a shoulder, in particular, the electronic evaluation circuit for evaluating the dangerous situation is trained by machine with a machine learning algorithm depending on the digital map and/or other information relating to driving on a shoulder.

* * * * *